(12) United States Patent
Fischer et al.

(10) Patent No.: US 6,513,635 B2
(45) Date of Patent: Feb. 4, 2003

(54) ACTUATING DEVICE WITH TWO PARALLEL MOUNTED ACTUATORS

(75) Inventors: Robert Fischer, Bühl (DE); Norbert Esly, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/977,921

(22) Filed: Oct. 15, 2001

(65) Prior Publication Data

US 2002/0063031 A1 May 30, 2002

Related U.S. Application Data

(63) Continuation of application No. PCT/DE00/01069, filed on Apr. 5, 2000.

(30) Foreign Application Priority Data

Apr. 15, 1999 (DE) .......................................... 199 16 937

(51) Int. Cl.[7] .............................................. B60K 23/00
(52) U.S. Cl. ..................... 192/83; 74/335; 192/84.6
(58) Field of Search ................... 192/83, 84.6, 91 R; 74/335, 336 R; 60/702, 716, 545; 318/8

(56) References Cited

U.S. PATENT DOCUMENTS

| | | | | |
|---|---|---|---|---|
| 2,104,731 A | * | 1/1938 | Bragg | 192/91 R |
| 2,873,834 A | * | 2/1959 | Kepner | 192/91 R |
| 3,433,340 A | * | 3/1969 | Murakami | 192/91 R |
| 4,991,702 A | * | 2/1991 | Ladin | 192/91 R |
| 5,094,115 A | * | 3/1992 | Michihira et al. | 74/335 |
| 5,133,439 A | * | 7/1992 | Shellhause | 192/91 R |
| 5,273,143 A | * | 12/1993 | Voss et al. | 192/83 |
| 5,507,197 A | | 4/1996 | Devaud et al. | |
| 5,579,882 A | | 12/1996 | Stuhldreher | |
| 5,823,308 A | | 10/1998 | Ladin et al. | |
| 5,906,256 A | * | 5/1999 | Hayashi et al. | 192/83 |
| 5,954,176 A | * | 9/1999 | Ishihara et al. | 192/83 |
| 6,003,395 A | * | 12/1999 | Rogg et al. | 74/335 |

FOREIGN PATENT DOCUMENTS

| | | |
|---|---|---|
| DE | 40 00 835 A1 | 7/1991 |
| DE | 19504847 | 9/1995 |

* cited by examiner

*Primary Examiner*—Rodney H. Bonck
(74) *Attorney, Agent, or Firm*—Darby & Darby

(57) ABSTRACT

An actuating device for an operating element such as a clutch (4) in the power train between the engine (2) and the driven wheels (12) of a motor vehicle consists of a parallel arrangement of at least two actuators (25a, 25b) that are controlled by an electronic control device (31) so that they can work simultaneously or one after the other, or with a partial time overlap where one starts to work after an initial current surge to the other has subsided.

10 Claims, 3 Drawing Sheets

ACTUATING DEVICE WITH TWO PARALLEL MOUNTED ACTUATORS

This is a continuation of international application Ser. No. PCT/DE00/01069, filed Apr. 5, 2000, the entire disclosure of which is hereby incorporated by reference.

BACKGROUND OF THE INVENTION

The present invention relates to a device for actuating an element in the power train of a motor vehicle, such as a clutch-actuating device or a transmission-actuating device.

Such devices are known in general in the existing state of the art. For example, DE 195 04 847 may be named as a reference for a device proposed earlier by the assignee of the present invention. Actuating devices of the type described herein are used, e.g., with friction clutches in the power trains of motor vehicles. In friction clutches, the force required for the release (disengagement) of the clutch depends among other factors on the magnitude of the torque being transmitted through the clutch. Thus, different motor vehicles with different engines will require different clutch-release forces. Also, the required speed of actuation may vary. In an actuator that is powered by an electric motor, an upper limit of the actuating force is dictated by the size of the electric motor, which has to fit into the available space. Also, with a larger motor, friction losses would use up a considerable part of the added power.

Nevertheless, actuators for clutches and transmissions need to be matched to the greatest diversity of dimensional requirements. This has the disadvantage that a large number of different actuator designs have to be developed, with each different actuator model being used only in small numbers.

OBJECT OF THE INVENTION

It is therefore the object of the present invention to provide a concept for an actuating device, where a smaller number of different actuator designs can satisfy the requirements of a given number of different vehicle models.

SUMMARY OF THE INVENTION

To meet the foregoing objective, the present invention provides an actuating device for an operating element in the power train between the engine and the driven wheels of a motor vehicle. The inventive actuating device is distinguished in that it employs at least two actuators arranged in parallel to actuate the operating element.

In practical applications, the operating element will normally be a clutch or a transmission.

It is of practical advantage if the parallel actuators can be operated simultaneously at least part of the time.

It is likewise of practical advantage if the parallel actuators can be operated sequentially at least part of the time.

In advantageous embodiments of the invention, each of the parallel actuators has its own electric motor. It has practical benefits if the electric current to the motors is turned on during sequentially staggered time intervals.

It is further advantageous if the actuators work together in parallel during part of the time to actuate the clutch or other operating element.

According to a further concept of the invention, it is of practical benefit in an arrangement of two actuators with two electric motors, if the electric current to the second motor is switched on only after the start-up current of the first motor has fallen below a prescribed threshold value.

It is further practical if the start-up current of one or the other or both motors is limited so that the sum of the currents does not exceed a prescribed limit.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The invention is described below with additional details, based on examples that are illustrated in the attached schematic drawings, wherein.

DETAILED DESCRIPTION OF THE INVENTION

Figure 1:
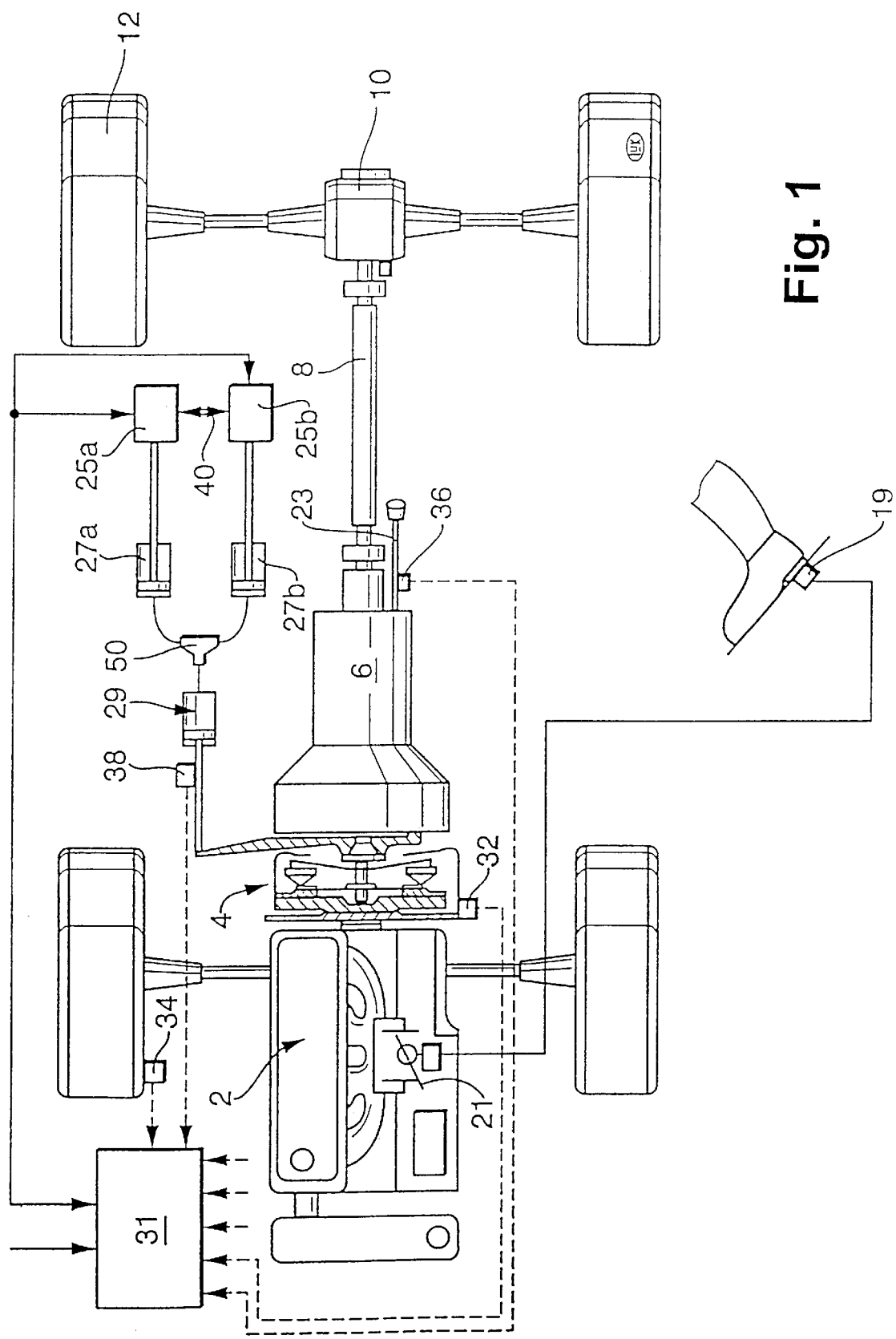
FIG. 1 represents a schematic view of a power train of a vehicle with a block diagram of the actuating device according to the invention.

FIG. 1 illustrates a motor vehicle with an engine 2 driving the rear wheels 12 by way of a clutch 4, transmission 6, drive shaft 8, and differential 10. The invention is equally applicable to vehicles with front-wheel drive or all-wheel drive. The scope of the invention also includes configurations where the clutch is arranged downstream of the transmission. The transmissions 6 can be of a type that is shifted in discrete steps or with a steplessly variable transmission ratio.

An accelerator pedal 19 serves to control the output load of the combustion engine 2 through a throttle valve 21. The transmission 6, shown here as a manual transmission, is shifted by means of a shift lever 23. The clutch 4 is automated and is moved by the two actuators 25a, 25b through master cylinders 27a, 27b and a slave cylinder 29. The actuators 25a, 25b are controlled by an electronic control device 31 containing a microprocessor and associated memory. The inputs of the electronic control device 31 are connected to sensors of the power train, e.g., an rpm sensor 32 for the engine, an rpm sensor 34 for the front wheels, a shift-lever sensor 36 to detect when the driver intends to shift gears, a sensor 38 to detect the state of engagement of the clutch, and possibly other sensors. The sensor 38 can be arranged at the master cylinder or the slave cylinder. A sensor 38 can also be used with a purely mechanical transfer of an actuating movement or force.

The actuators 25a, 25b are controlled by an electronic control device 31, but it may also be practical if only actuator 25a is directly controlled by the control device 31 and the two actuators are connected to each other by a signal line 40. The actuators 25a, 25b are coupled to the pistons of the master cylinders 27a, 27b, respectively, and the latter are in turn connected through hydraulic lines to the slave cylinder 29. A coupling piece 50, preferably configured as a T-coupler connects the hydraulic lines from the two master cylinders to the single line that leads to the slave cylinder.

Figure 3:
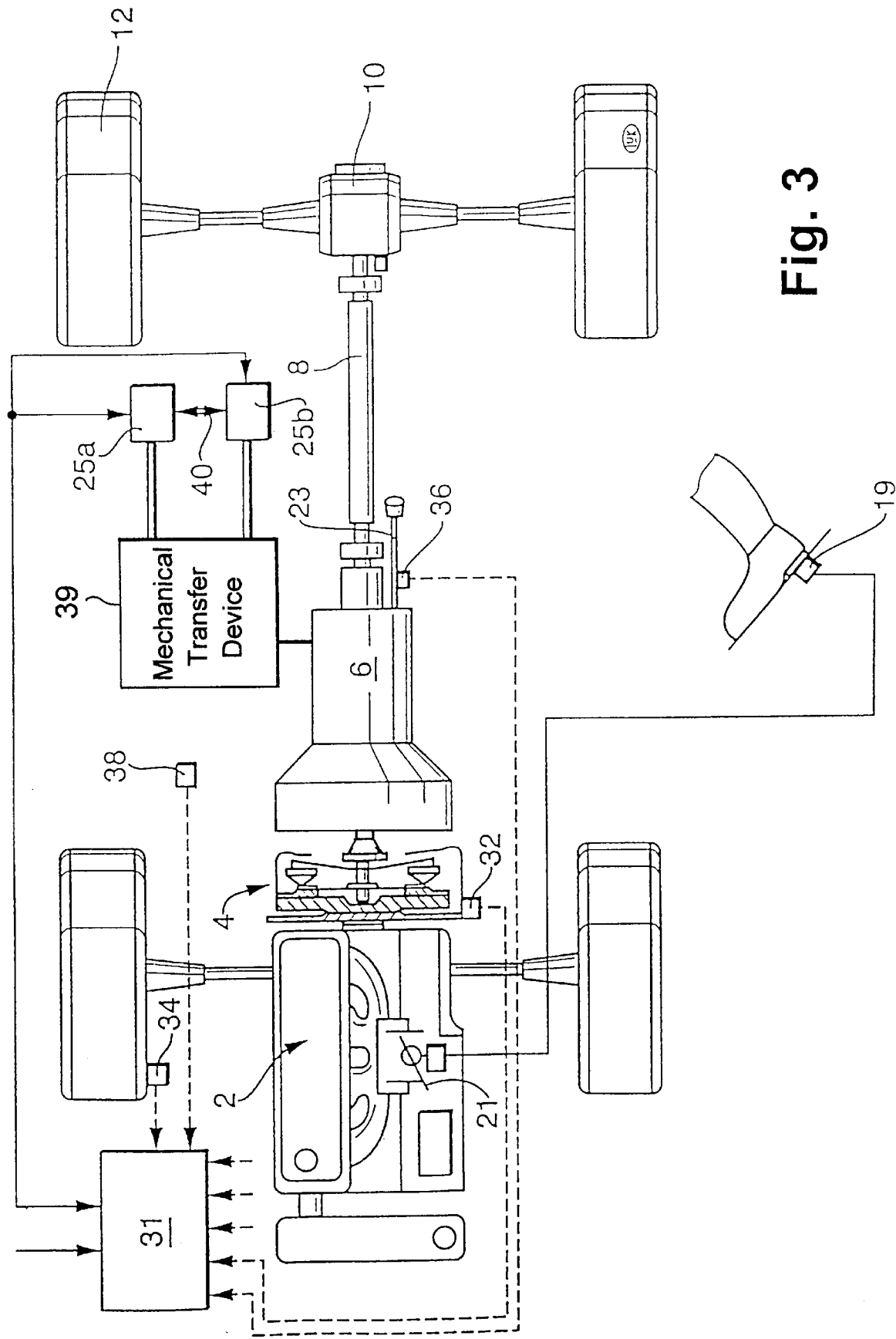
FIG. 3 represents a schematic view of a power train of a vehicle with a block diagram of the actuating device according to another embodiment.

In another embodiment, it is of particular practical benefit if the two actuators are coupled through a direct mechanical transfer connection to actuate the clutch or the transmission. The mechanical transfer connection can consist, e.g., of a force- or torque-summing mechanism such as a lever linkage or a planetary gear arrangement. For example, FIG. 3 illustrates an embodiment where the two actuators 25a, 25b are coupled through a direct mechanical transfer connection 39 to the transmission 6.

By arranging at least two actuators in parallel, it is possible to obtain at least part of the time a summation of the contributions of the individual actuators, whereby the effect of an individual actuator is multiplied. By controlling or energizing the actuators individually, it is possible to have the actuators work at times simultaneously and at other times sequentially.

Figure 2A:
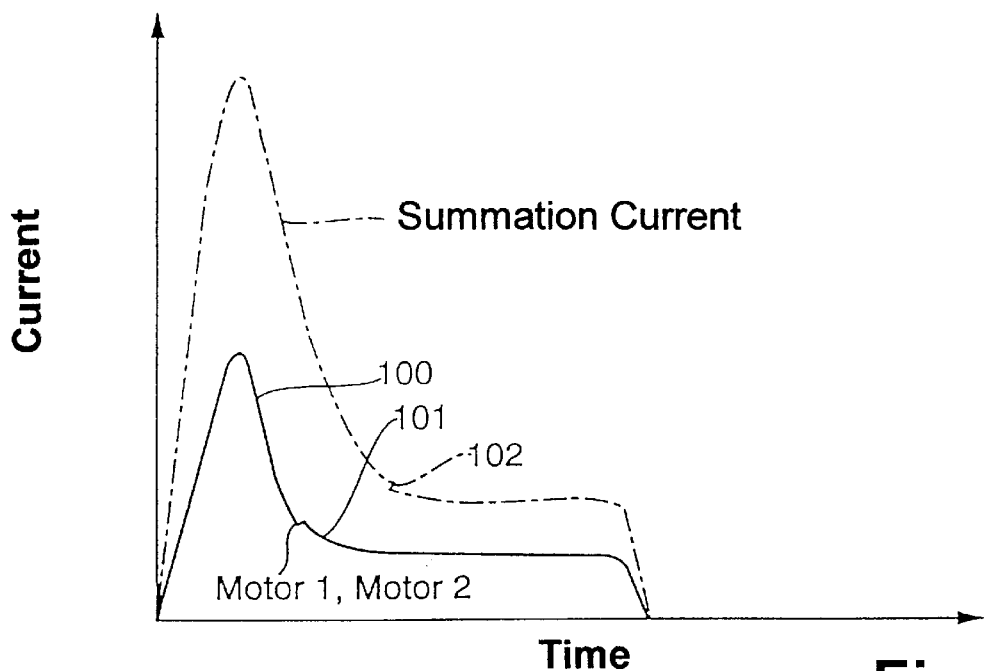
FIGS. 2a to 2c represent characteristic graphs of current vs. time.
Figure 2B:
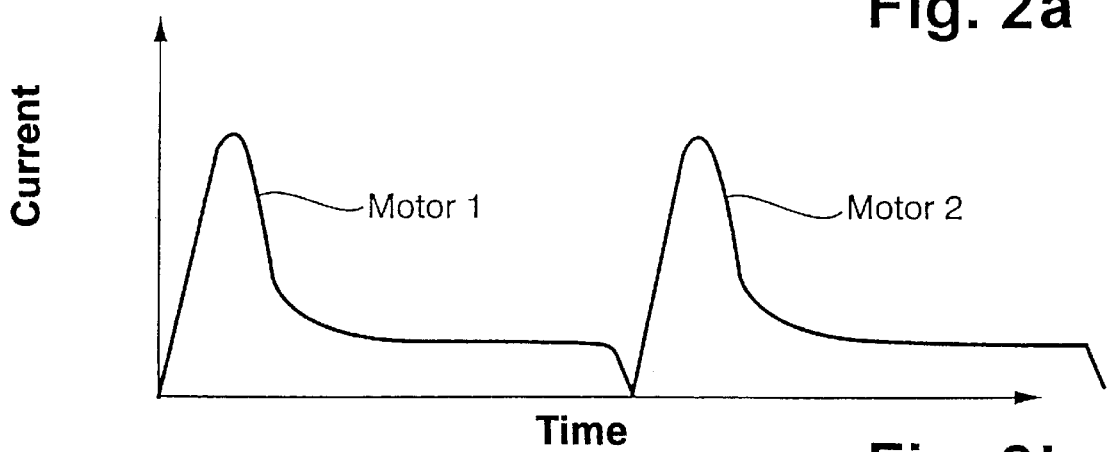
Figure 2C:
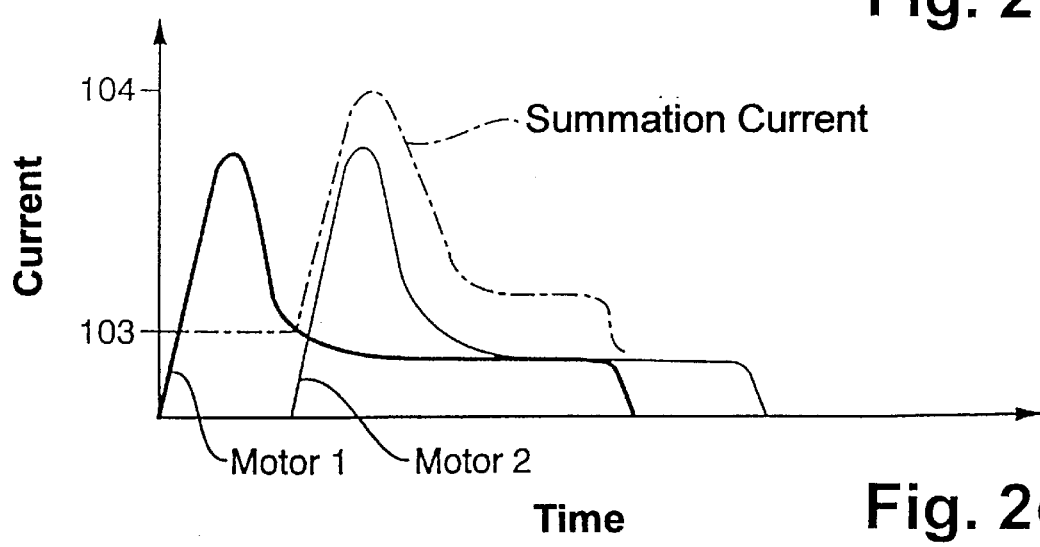

FIGS. 2a to 2c show current-versus-time graphs to illustrate how two electrically powered actuators are energized to move a clutch or transmission. The motors of the actuators are supplied independently with current.

In FIG. 2a, the motors of the two actuators are simultaneously supplied with current and work in parallel to actuate the operating element such as a clutch. The current 102 represents the sum of the individual currents 100, 101. The start-up current surge occurs simultaneously in both motors.

In FIG. 2b, the motors of the two actuators are energized sequentially, so that they work one after the other to actuate the operating element. The total current is equal to the current of one individual motor at a time. When the first motor has essentially arrived at its end position, the other motor is activated.

In FIG. 2c, the two motors are operated in a sequentially staggered mode, so that they work part of the time together and part of the time individually. The second motor is activated when the start-up current of the first motor has fallen below a prescribed threshold value 103.

In another advantageous embodiment, the start-up current of one or the other or both motors can be limited so that the summation current 102 does not exceed a prescribed limit 104.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An actuating device for an operating element in a power train between an engine and at least one driven wheel of a motor vehicle, wherein the actuating device comprises at least two actuators arranged in parallel to actuate the operating element, wherein each of the at least two actuators comprises and is powered by its own electric motor, wherein a first of the at least two actuators comprises a first motor and a second of the at least two actuators comprises a second motor, wherein electric current is supplied to the first motor during a first time interval and to the second motor during a second time interval, and wherein the first time interval and the second time interval are sequentially staggered and are partially overlapping and wherein the second time interval starts only after a start-up current surge to the first motor has fallen below a prescribed threshold value.

2. The actuating device of claim 1, wherein the operating element comprises a clutch.

3. The actuating device of claim 1, wherein the operating element comprises a transmission.

4. The actuating device of claim 1, wherein the at least two actuators are arranged to be operated simultaneously at least part of the time.

5. The actuating device of claim 1, wherein the at least two actuators are arranged to be operated sequentially at least part of the time.

6. An actuating device for an operating element in a power train between an engine and at least one driven wheel of a motor vehicle, wherein the actuating device comprises at least two actuators arranged in parallel to actuate the operating element, wherein each of the at least two actuators comprises and is powered by its own electric motor, wherein a first of the at least two actuators comprises a first motor and a second of the at least two actuators comprises a second motor, wherein electric current is supplied to the first motor during a first time interval and to the second motor during a second time interval, and wherein the first time interval and the second time interval are sequentially staggered and wherein the first motor has a first start-up current surge and the second motor has a second start-up current surge, and wherein the actuating devices comprise means to limit at least one of the first and second start-up current surge, so that a summation of the first and second start-up surge does not exceed a prescribed current limit.

7. The actuating device of claim 6, wherein the operating element comprises a clutch.

8. The actuating device of claim 6, wherein the operating element comprises a transmission.

9. The actuating device of claim 6, wherein the at least two actuators are arranged to be operated simultaneously at least part of the time.

10. The actuating device of claim 6, wherein the at least two actuators are arranged to be operated sequentially at least part of the time.

* * * * *